US006811824B2

(12) United States Patent
Hassan et al.

(10) Patent No.: US 6,811,824 B2
(45) Date of Patent: Nov. 2, 2004

(54) REPULPABLE WAX

(75) Inventors: Aziz Hassan, Sugarland, TX (US); Abbas Hassan, Sugarland, TX (US); Gregory Borsinger, Chatham, NJ (US)

(73) Assignee: Marcus Oil and Chemical Corp., Houston, TX (US)

(*) Notice: Subject to any disclaimer, the term of this patent is extended or adjusted under 35 U.S.C. 154(b) by 76 days.

(21) Appl. No.: 10/137,689

(22) Filed: May 3, 2002

(65) Prior Publication Data

US 2003/0152707 A1 Aug. 14, 2003

Related U.S. Application Data

(60) Provisional application No. 60/345,915, filed on Jan. 4, 2002.

(51) Int. Cl.[7] ......................... B05D 3/00; C09D 191/00; C09D 191/06

(52) U.S. Cl. .................... 427/391; 427/392; 427/393.4; 106/220; 106/222; 106/224; 106/244; 106/245; 106/252; 106/270; 524/270; 524/274; 524/313

(58) Field of Search ................................ 427/391, 392, 427/393.4; 106/220, 222, 224, 244, 245, 252, 270; 524/270, 274, 313

(56) References Cited

U.S. PATENT DOCUMENTS

| | | | | |
|---|---|---|---|---|
| 3,847,637 A | | 11/1974 | Luszczak | 106/271 |
| 5,491,190 A | | 2/1996 | Sandvick et al. | 524/322 |
| 6,001,286 A | * | 12/1999 | Sleeter | 264/13 |
| 6,127,326 A | | 10/2000 | Dieckmann et al. | 508/491 |

FOREIGN PATENT DOCUMENTS

| | | | |
|---|---|---|---|
| WO | WO 95/03135 | 2/1995 | B05D/3/02 |

OTHER PUBLICATIONS

[CARGILL], Oils and Shortenings– Steariness/Flakes, from www.web.archive.org archive of Cargill Foods Webpage "Page info" date last modified Oct. 25, 2001.*

[Imperial Industrial Chemicals], Technical Information Stearine Wax, Product Code ST–WAX, 1999.*

Imperial Industries Chemicals, Technical Information Stearine Wax Product Code:St–Wax, 1999.*

Notification of Transmittal of the International Search Report, mailed Jun. 6, 2003.

International Search Report—PCT/US 03/00121 (No date provided).

Database WPI—XP–002239726 (No date provided).

* cited by examiner

*Primary Examiner*—David Brunsman
(74) *Attorney, Agent, or Firm*—Thomas L. Adams

(57) ABSTRACT

Waxes prepared from hydrogenated plant oils, such as palm and soybean, are used to render cellulosic materials resistant to water. Unlike cellulosic materials rendered water resistant with waxes obtained using petroleum-derived or synthetic waxes, the water resistant cellulosic materials prepared using this composition are recyclable using conventional paper recycling methods; the composition is dispersible in warm water solutions. Such water resistant materials are characterized by enhanced moisture barrier properties. The compositions have a low iodine value (between 2–5), and melting points between approximately 120–165 degrees F. (Mettler Drop Point). The wax comprises a triglyceride whose fatty acids are predominantly stearic acid ($C_{18}$). The composition is used as an additive in the manufacture of wax coated boxes and adhesive compounds used in boxboard packaging and manufacturing operations.

11 Claims, 1 Drawing Sheet

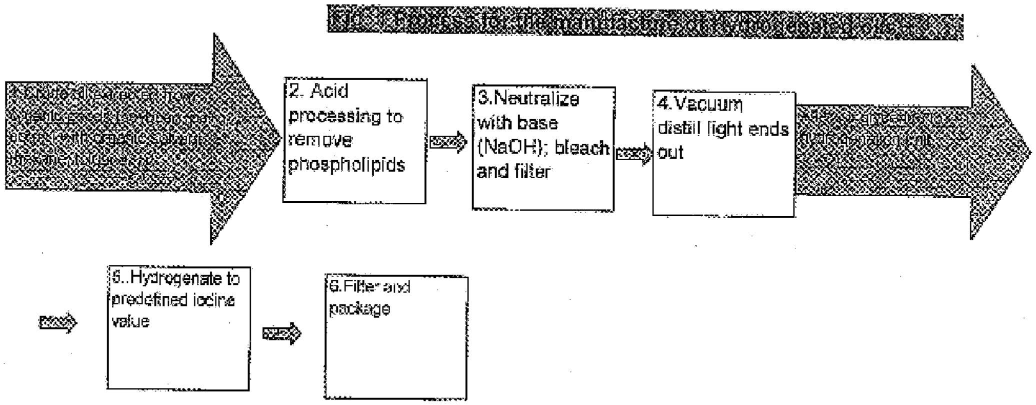
2. Acid processing to remove phospholipids
3.Neutralize with base (NaOH); bleach and filter
4.Vacuum distill light ends out
5..Hydrogenate to predefined iodine value
6.Filter and package

REPULPABLE WAX

CROSS-REFERENCES TO RELATED APPLICATIONS

This application claims the benefit of U.S. Provisional Patent Application, Ser. No. 60/345,915, filed on 4 Jan. 2002, the contents of which are hereby incorporated by reference in their entirety.

FIELD OF THE INVENTION

The present invention is a vegetable wax comprising triglycerides. Particularly, the present invention is used as an additive in boxboard coatings and adhesives, either by itself or as part of a composition, to render the coating or adhesive dispersible in warm alkaline water.

BACKGROUND OF THE INVENTION

Petroleum waxes, such as paraffin and microcrystalline wax, and synthetic waxes such as Fischer Tropsch ("FT") and polyethylene, are used extensively in paper coatings to impart moisture resistance and enhanced moisture vapor barrier properties to the paper. Waxes used for this purpose tend to be low viscosity (<1,000 cps @ 284 degrees F) and have relatively low melting temperatures (<302 degrees F).

Large oil companies such as Shell Oil, ExxonMobil and other oil refiners supply petroleum waxes used in these applications. Most of this wax is derived in the process of refining lube oil where the wax is separated from the lube oil stock and refined into various fractions of wax including paraffins, and microcrystalline waxes. Formulators such as Astor Wax, IGI and Moore & Munger also supply wax for these applications that is either resold as is from the oil companies, and/or formulated and repackaged to meet the specific needs of customers. The two largest suppliers of FT waxes are Sasol from South Africa and Shell Oil from Malaysia. The waxes are sometimes formulated with other ingredients to modify their properties for specific applications. Such modifiers include resins to improve strength and toughness or improve flexibility or gloss.

These waxes are also used extensively in adhesives, whose formulations usually incorporate a resin (such as ethylene vinyl acetate "EVA", or polyethylene) and a tackifier (such as a rosin ester, or tall oil fatty acid derivatives) to provide a coating that can bond or seal paper articles. Waxes are used in adhesive coatings to provide additional functionality to the adhesive coating, such as set speed and thermal stability.

A common characteristic of waxes used in coating paper and formulating adhesives is that they have a relatively low viscosity to enable flow of the coating or adhesive and its penetration of the cellulosic fiber. Typical viscosity ranges of waxes used in these applications are from about 10 SUS (Seybolt method) at 210 F to about 300 SUS at 300 F. In general, the lower the viscosity, the better the penetration into the cellulosic substrate. Better penetration is generally desirable for good adhesion.

Waxes used in coating paper and formulating adhesives can be used alone, but more commonly are formulated with other materials to modify and enhance their properties. Such materials used as additives might include antioxidants (such as butylated hydroxy toluene "BHT", and other free radical scavenger materials), coupling agents (maleic modified polymers), gloss enhancing agents, and additives for rendering the coating more flexible (ethylene or ethylene vinyl acetate copolymers) are among some of the more commonly used modifiers for wax coatings.

Many different types of cellulosic materials are coated with petroleum and synthetic waxes to impart moisture resistance and adhesive properties. Wax coating techniques are well understood to those skilled in the art. Wax coating can involve immersion of the cellulosic material in a molten bath of the wax. It can also involve cascade and curtain coating where a thin layer of molten wax is allowed to flow onto the cellulosic material. See, for example, Sandvick et al. (U.S. Pat. No. 5,491,190, incorporated by reference herein). Other techniques are also used depending on the desired placement of the wax on the cellulosic material.

Coating and adhesive formulations containing petroleum and/or synthetic waxes present an inherent problem when paper products containing these compounds are recycled to recover the fiber components for reuse. Recycling paper involves mixing the paper to be recycled with warm water, usually with a pH in the alkaline range (>pH7). When wax is present in the recycled paper, the wax does not solubilize but forms what is known in the trade as 'stickies'. The "stickies" is material that causes paper processing and forming machinery to become dirty and have gum like deposits, which cause maintenance and other problems for paper manufacturers. In addition, the 'stickies' deposit on the recycled paper, tending to form unsightly spots and thus causing the recycled paper to have a lower commercial value, and in some cases, not to be useable at all (See, for example, Watanabe et al., U.S. Pat. No. 6,117,563).

Various techniques have been used in attempts to overcome the problem of removing petroleum and synthetic waxes in the process of recycling paper. Various additives to the wax have been tried (U.S. Pat. Nos. 6,273,993, 6,255,375, 6,113,738, 5,700,516, 5,635,279, 5,539,035, 5,541,246, 6,007,910, 5,587,202, 5,744,538, 5,626,945, 5,491,190, 5,599,596). These patents are incorporated here by reference.

For example, Michelman (U.S. Pat. No. 6,255,375 B1) discloses incorporation of at least one chemical compound which is either itself capable of acting as a latent dispersant for the coating, or capable of being chemically modified so as to act as a dispersant, thus rendering the hot melt coating more readily dispersible from the coated product.

Chiu (U.S. Pat. No. 6,113,729) discloses using hydrogen peroxide with various waxes to produce laminated wood products with a light color.

Ma et al. (U.S. Pat. No. 5,635,279) discloses inclusion of a polystyrene-butadiene polymer, in combination with a paraffin or polyethylene wax emulsion, for treating paper products.

Miller et al. (U.S. Pat. No. 5,744,538) disclose a low molecular weight, branched copolyester for use in an adhesive.

Sandvick et al. (U.S. Pat. Nos. 5,491,190, 5,599,696 and 5,700,516) disclose compositions comprising ethylenically unsaturated monocarboxylic acids in combination with either a fatty acid or paraffin wax to render paper products water resistant and repulpable.

Severtsen et al. (U.S. Pat. No. 6,113,738) disclose the addition of plasticizers, dispersants or wetting agents to the recycling mixture to facilitate wax breakdown and dispersion.

Vemula (U.S. Pat. No. 5,891,303) discloses a process using a heated solvent, n-hexane, to remove wax from waste paper, and indicates that both the wax and the paper can be recovered from the recycling process.

In addition there have been mechanical techniques used in an attempt to recycle wax containing paper products through processes such as floating the wax from the slurried paper mix. Heise et al. (U.S. Pat. No. 6,228,212 B1) disclose a method to remove wax from paper during recycling, using a combination of floatation and filtration. They note that the majority of waxes used in the paper industry are petroleum-based waxes. Because none of these techniques are commercially viable, it is still customary in many locations to isolate wax coated paper products and send them to a landfill or to an incinerator in lieu of recycling them (Heise et al., U.S. Pat. No. 6,228,212 B1).

The prior art thus illustrates the use of petroleum derived waxes, synthetic waxes, and certain vegetable waxes for rendering cellulosic articles water resistant, or for their inclusion in adhesives for attachment of cellulosic articles. However, the problem of recycling articles containing these compositions remains. Therefore, there is a need for employing a composition, which has the barrier and physical properties of petroleum derived or synthetic waxes while allowing for the economical recycling of fibrous cellulosic materials, which have incorporated these waxes as coatings and/or adhesives. Due the large volume of waxes consumed in these applications it is also preferred that the compositions be readily available. From both a supply and a natural resource viewpoint, it is preferred that the compositions be obtained from a source that preferably is renewable, such as from plant extracts.

It is also known through experience with synthetic low molecular weight ethylene based polymers that have wax-like characteristics, that as more functionality is added to the wax-like polymer, by the addition of ester and/or carboxyl groups, the polymer wax can be made increasingly soluble in alkaline water. Functionality of low molecular weight synthetic polymers can be increased by co-polymerization and/or grafting co-monomers such as acrylic acid into the polymer. The saponification value of a polymer, as measured by the amount of KOH needed to neutralize one gram of polymer, is a good measurement of both carboxyl and ester functionality of a polymer. It is known that as the saponification value begins to exceed about 130 mgKOH/gm, the polymer will start to solubilize in warm alkaline water. Pure acrylic polymers are very functional and have good solubility in water. These synthetic polymers with wax-like characteristics and functional groups are not widely used in wax coating and adhesive formulations due to their excessive cost to manufacture and their inherent undesirable properties such as relatively high viscosity and their being relatively soft.

The present invention is a natural wax for use in paper coatings and paper adhesives. The product is a commercially available high triglyceride wax derived from the processing of natural oil containing commodities such as soybeans, palm and other crops from which oil can be obtained. The materials are processed and supplied by Archer Daniels Midland (Decatur Ill.) designated by their product number 86-197-0, Cargill Incorporated (Wayzata, Minn.) designated by their product number 800mrcs0000u and other sources under a generic name 'hydrogenated soybean oil'. Palm oil wax was supplied by Custom Shortenings & Oils (Richmond, Va.) and was desigiated as their product Master Chef Stable Flake-P.

BRIEF SUMMARY OF THE INVENTION

It is an object of the present invention to provide a composition that can be applied to fibrous cellulosic objects such as paper and paperboard, and render such treated cellulosic objects recyclable using conventional means of recycling.

It is an object of the present invention to provide a material that can be coated on fibrous cellulosic objects such as paper and paperboard, using conventional coating means.

Another object of the present invention is to provide a composition which when applied to fibrous cellulosic objects imparts barrier properties required to protect the cellulosic object and/or it contents from moisture.

Still another object of the present invention is to provide a composition which when applied to fibrous cellulosic objects and renders those cellulosic objects water resistant, can then be removed from the treated cellulosic objects using conventional methods of recycling fibrous cellulosic materials without having the deleterious effects associated with conventional petroleum and or synthetic waxes.

Yet another object of the present invention is to provide a composition which can be derived from a renewable resource in place of non-renewable petroleum based compositions.

Another object of the present invention is to provide a composition which can replace the petroleum and/or synthetic wax component of an adhesive formulation with a composition that can render the adhesive repulpable without impairing the adhesive properties of the formulation.

Still another object of the present invention is to provide a renewable source of moisture resistant wax, which can be economically produced.

Another object of the present invention is to provide a composition for use in paper coating and/or adhesive that is generally regarded as safe by the Food and Drug Administration.

The present inventors have unexpectedly discovered that highly hydrogenated oils such as palm and soybean can be converted into a wax that can be used effectively as substitutes for conventional petroleum and synthetic waxes in the coating of cellulosic materials with the ability to recycle those cellulosic materials through commercially available means.

The present invention relates to a coating composition of a highly hydrogenated vegetable oil (palm, soybean, corn) that has wax-like properties and can be coated on cellulosic materials such as paper and paperboard through conventional means and subsequently removed through commercially practiced recycling techniques. The hydrogenated oils that can be used are >90% triglyceride and have a range of carbon numbers with C18 being the most predominant component (>50%).

The present invention comprises waxes prepared from hydrogenated plant oils, such as palm and soybean, that are used to render cellulosic materials resistant to water. Unlike cellulosic materials rendered water resistant with waxes obtained using petroleum-derived or synthetic waxes, the water resistant cellulosic materials prepared using this composition are recyclable using conventional paper recycling methods; the composition is dispersible in warm water solutions. Such water resistant materials are characterized by enhanced moisture barrier properties. The compositions have a low iodine value (between 2–5), and melting points between approximately 120–165 degrees F (Mettler Drop Point). The wax comprises a triglyceride whose fatty acids are predominantly stearic acid ($C_{18}$). The composition is used as an additive in the manufacture of wax coated boxes and adhesive compounds used in boxboard packaging and manufacturing operations.

BRIEF DESCRIPTION OF THE SEVERAL VIEWS OF THE DRAWING

FIG. 1 is a flow chart illustrating a process for the manufacture of hydrogenated oils.

DETAILED DESCRIPTION OF THE INVENTION

The present invention is a wax composition, derived from compounds of plant origin, which can be used to coat fibrous cellulosic materials, such as paper, corrugated boxes, paperboard, fiberboard and the like, to render the material water resistant, yet which composition can be removed from the treated material by dispersion in warm alkaline water, enabling the recycling of the treated material using conventional methods of paper recycling.

The composition of the present invention can also be used in the formulation of an adhesive, which is applied to cellulosic materials, and which adhesive is dispersible when materials containing the adhesive are recycled using conventional methods of recycling.

As known in the art, triglycerides are fatty acid esters of glycerol. As used herein, the term "free fatty acid" will refer to a fatty acid that is not covalently bound through an ester linkage to glycerol. Additionally, as used herein, the term "fatty acid component" will be used to describe a fatty acid that is covalently bound through an ester linkage to glycerol. The terms "repulping" and "recycling", or "repulpability" and recyclability", will be used interchangeably, referring to the process of recycling fibrous materials, and the ability of such materials to be recycled, respectively.

Naturally occurring carboxylic acids ("fatty acids") and their derivatives, most commonly the glyceryl derivatives in which all three hydroxy groups of the glycerol molecule are esterified with a carboxylic acid, are used commercially. The carboxylic acids may be saturated or unsaturated. The trisubstituted glycerols (triglycerides, also referred to as triacylglycerols) are major components of most animal and plant fats, oils and waxes. When all three hydroxy groups of a glycerol molecule have been esterified with the same fatty acid, it is referred to as a monoacid triglyceride. Whether one refers to triglycerides as "waxes," "fats," or "oils" depends upon the chain lengths of the esterified acids and their degree of saturation or unsaturation as well as the ambient temperature at which the characterization is made. Generally, the greater the degree of saturation and the longer the chain length of the esterified acids, the higher will be the melting point of the triglyceride.

Naturally occurring and synthetic waxes are extensively used in a wide cross-section of industries including the food preparation, pharmaceutical, cosmetic, and personal hygiene industries. The term wax is used to denote a broad class of organic ester and waxy compounds which span a variety of chemical structures and display a broad range of melting temperatures. Often the same compound may be referred to as either a "wax," "fat" or an "oil" depending on the ambient temperature. By whatever name it is called, the choice of a wax for a particular application is often determined by whether it is a liquid or solid at the temperature of the product with which it is to be used. Frequently it is necessary to extensively purify and chemically modify a wax to make it useful for a given purpose. Despite such efforts at modification, many of the physical characteristics of waxes still prevent them from being used successfully or demand that extensive, and oftentimes, expensive, additional treatments be undertaken to render them commercially useable.

Many commercially utilized triglycerides and free fatty acids are obtained preferably from plant sources, including soybean, cottonseed, corn, sunflower, canola and palm oils. The triglycerides are used after normal refining processing by methods known in the art. For example, plant triglycerides may be obtained by solvent extraction of plant biomass using aliphatic solvents. Subsequent additional purification may involve distillation, fractional crystallization, degumming, bleaching and steam stripping. The triglycerides obtained are partially or fully hydrogenated. Furthermore, fatty acids may be obtained by hydrolysis of natural triglycerides (e.g., alkaline hydrolysis followed by purification methods known in the art, including distillation and steam stripping) or by synthesis from petrochemical fatty alcohols. The free fatty acids and triglycerides may further be obtained from commercial sources, including Cargill, Archer Daniels Midland, and CentralSoya.

In the present invention. the free fatty acids and fatty acid components of the triglycerides are preferably saturated, and have various chain lengths. The free fatty acids and fatty acid components of the triglycerides may be unsaturated, provided that the coating composition will be a solid at the temperature at which the coating is used. The properties of the free fatty acid/triglyceride mixture, such as melting point, varies as a function of the chain length and degree of saturation of the free fatty acids and the fatty acid components of the triglycerides. For example, as the degree of saturation decreases, the melting point decreases. Similarly, as the chain length of the fatty acids decreases, the melting point decreases. Preferred free fatty acids are saturated fatty acids, such as palmitic acid, and other saturated fatty acids having longer carbon chain lengths, such as arachidic acid and behenic acid. Stearic acid is further preferred.

The iodine value ("I.V."), also referred to as the iodine number, is a measure of the degree of saturation or unsaturation of a compound. The iodine value measures the amount of iodine absorbed in a given time by a compound or mixture. When used in reference to an unsaturated material, such as a vegetable oil, the IV is thus a measure of the unsaturation, or the number of double bonds, of that compound or mixture.

Vegetable oils or animal fats can be synthetically hydrogenated, using methods known to those skilled in the art, to have low or very low iodine values. Fats naturally composed primarily of saturated triglycerides (such as palm oil or fractionated fats) can be used alone or in blend formulations with adhesives/laminants to achieve an enhanced water tolerance for composite materials (U.S. Pat. No. 6,277,310). The major components of plant oils are triacylglycerols.

Saturated triglycerides having a low iodine value (a range of iodine values of about 0–70 with 0–30 preferred) may be produced by hydrogenation of a commercial oil, such as oils of soybean, soy stearine, stearine, corn, cottonseed, rape, canola, sunflower, palm, palm kernel, coconut, crambe, linseed, peanut, fish and tall oil; or fats, such as animal fats, including lard and tallow, and blends thereof. These oils may also be produced from genetically engineered plants to obtain low IV oil with a high percentage of fatty acids.

Fats are commonly fractionated by a process known as "winterization", wherein the mixture is chilled for a period of time which is long enough to allow the harder fractions of the fats to crystallize. This chilling is followed by filtration, with the harder fractions being retained on a filter cake. These harder fractions have a lower iodine value and, therefore, a melting point that is higher than the melting point of the fat from which it has been separated. Hence, winterization can be used as a source for lower IV fats.

The winterization process is generally used to fractionate animal fats, and can thus produce a variety of animal fat fractions, having differing iodine values and consequently, differing chemical properties. These fractions can be blended with fatty acids and free fatty acids obtained from other sources, such as plant or vegetable extracts referred to above, and these blends can also be used in the present invention.

The present invention performs best with a hydrogenated triglyceride where the iodine value is close to zero thereby rendering the triglyceride more thermally stable. The triglycerides can be chosen from those having an iodine value of between 0–30, but a triglyceride having an iodine value of between 2–5 is preferred.

Although the exact chemical compositions of these waxes are not known as the nature of these by-products vary from one distillation process to the next, these waxes are composed of various types of hydrocarbons. For example, medium paraffin wax is composed primarily of straight chain hydrocarbons having carbon chain lengths ranging from about 20 to about 40, with the remainder typically comprising isoalkanes and cycloalkanes. The melting point of medium paraffin wax is about 50 degrees C. to about 65 degrees C. Microcrystalline paraffin wax is composed of branched and cyclic hydrocarbons having carbon chain lengths of about 30 to about 100 and the melting point of the wax is about 75 degrees C. to about 85 degrees C. Further descriptions of the petroleum wax that may be used in the invention may be found in Kirk-Othmer, Encyclopedia of Chemical Technology, 3rd Edition, Volume 24, pages 473–76, the contents of which is hereby incorporated by reference.

Adhesives generally comprise a wax, a tackifying agent and polymeric resin. When an adhesive is applied to a substrate, such as, for example only, paper or other cellulose based products, and the substrates joined to each other, the adhesive serves to bond the substrates together. Hot melt adhesives are routinely used in the manufacture of corrugated cartons, boxes and the like. They are also used in bookbinding, and in sealing the ends of paper bags. Hot melt adhesives are generally selected because of their ability to maintain a strong bond under difficult conditions, such as stress and shock in handling, high humidity and variations in the environmental temperature. The wax component of adhesives affects properties such as its setting speed and thermal stability.

Materials such as fillers and plasticizers are added to adhesives, depending upon the particular use of the adhesive. Stabilizers can be added to improve the molten adhesive. Examples of such stabilizers are 2,4,6-trialkylated monohydroxy phenols, or antioxidants such as butylated hydroxy anisole (“BHA”) or butylated hydroxy toluene (“BHT”).

A dispersant can also be added to these compositions. The dispersant can be a chemical which may, by itself, cause the composition to be dispersed from the surface to which it has been applied, for example, under aqueous conditions. The dispersant may also be an agent which when chemically modified, causes the composition to be dispersed from the surface to which it has been applied. As known to those skilled in the art, examples of these dispersants include surfactants, emulsifying agents, and various cationic, anionic or nonionic dispersants. Compounds such as amines, amides and their derivatives are examples of cationic dispersants. Soaps, acids, esters and alcohols are among the known anionic dispersants.

The rosins can be selected from one or more rosins, such as a rosin ester, a hydrogenated rosin, a high acid number rosin, a maleic modified rosin, or polymeric resins such as ethylene or ethylene vinyl acetate (“EVA”).

The present invention is a natural wax for use in paper coatings and paper adhesives. The product is a commercially available high triglyceride wax derived from the processing of natural oil containing commodities such as soybeans, palm and other crops from which oil can be obtained. The materials are processed and supplied by Archer Daniels Midland (Decatur Ill.) designated by their product number 86-197-0, Cargill Incorporated (Wayzata, Minn.) designated by their product number 800mrcs0000u and other sources under a generic name ‘hydrogenated soybean oil’. Palm oil wax was supplied by Custom Shortenings & Oils (Richmond, Va.) and was designated as their product Master Chef Stable Flake-P.

The specific waxes employed in the present invention are a palm oil wax and a soybean wax, prepared from hydrogenated oil. The latter was is designated as Marcus Nat 155, produced by Marcus Oil and Chemical Corp, Houston Tex. These waxes can also be used as food additives.

The properties of the two waxes are summarized in Tables 1 and 2, where it can be seen that these waxes have IV’s of between 5 and 2, respectively.

The soybean oil wax has a melting point, as measured by Mettler Drop Point, of between 155–160 degrees F, while that of the palm oil wax is between 136–142 degrees F.

These waxes are further characterized by having a viscosity of between 10–200 cps at a temperature of 210 degrees F, Each wax comprises 98% triglyceride by weight with trace amounts of fatty acids. The triglyceride gives the wax acid and ester functionality that can be measured by neutralization with KOH to yield a saponification (SAP) value. It has known to those skilled in the art that low molecular weight polymers such as synthetic ethylene acrylic acid copolymers having saponification values in excess of about 130 mgKOH/g to about 150 mg/g KOH begin to have enough functionality and polarity to render them soluble in warm alkaline water. In addition to the 98% triglyceride the palm and soy waxes can contain mono glycerol (up to about 2%) and trace amounts of other components, such as, but not limited to, sterols, metals, and other minor components.

When the waxes were analyzed for their fatty acid content using known methods of Gas Liquid Chromatography (“GLC”), the soybean wax was found to comprise between 82–94 % stearic acid ($C_{18:0}$) and between 3–14% palmitic acid ($C_{16:0}$). By comparison, the palm oil wax comprises approximately 55% stearic acid ($C_{18:0}$), 39.5% palmitic acid ($C_{16:0}$), 1.1% myristic acid ($C_{14:0}$) and approximately 1.0% oleic acid ($C_{18:1}$).

The general conditions used for repulping (recycling) of cellulosic products, such as paper, corrugated box board, linerboard, corrugated paper, and related products employ immersion of the products in warm, alkaline water (pH>7). A variety of agents can be added to the water to render it alkaline, and these agents include both inorganic and organic materials, such as, but not limited to, sodium bicarbonate, sodium carbonate, sodium hydroxide, disodium phosphate, ammonia and various organic amino compounds. For evaluation of the present invention, the aqueous solution was rendered alkaline by the addition of sodium carbonate, prior to the immersion of the cellulosic articles into the recycling mixture.

PREPARATION OF EXAMPLES

Example 1

Effect of Waxes on Water Resistance of Corrugated Box Board, and Recyclability of the Treated Box Board For the purpose of illustrating the invention, one inch by three inch strips of brown corrugated box board with no wax coating were prepared. Two beakers were prepared, one with palm wax, the other with soybean wax. The temperature of the wax was maintained at 125 degrees C. and the corrugated strips were dipped into the molten wax for a period of approximately two seconds. Samples were prepared, and dipped into the same wax for a second time and allowed to pick up additional wax. After cooling to let the wax solidify on the box board, these samples were studied for their water resistance, and their ability to be recycled. To test for water resistance, the treated samples were allowed to sit in room temperature water overnight, and the amount of water taken up by the sample was determined visually. To test for recyclability, the treated samples were immersed in an alkaline water solution for a few hours, under conditions simulating conventional paper recycling methods, and the results observed visually.

| Type Wax | Number of times corrugated samples dipped into wax | Observation after samples immersed in room temperature water overnight (approx 8 hrs @ 70° F.) | Observation after samples immersed in 125° F. alkaline (pH 10) water for 4 hrs. |
|---|---|---|---|
| Soybean | 1 | No sign of water pick-up by corrugated paper | Completely dissolved wax |
| | 2 | No. sign of water pick-up by corrugated paper | Completely dissolved wax |
| Palm | 1 | No sign of water pick-up by corrugated paper | Completely dissolved wax |
| | 2 | No sign of water pick-up by corrugated paper | Completely dissolved wax |

The results indicated that a coating of either soybean or palm wax could prevent water penetration into a corrugated box, and that the waxes could be removed from the box board. The latter results will be discussed in further detail in the repulping test in Example 2.

While this data is applicable to corrugated box board, it can be reasonably assumed that articles fabricated of other cellulosic materials not intended for boxes, such as, but not limited to papers, corrugated paper, linerboard, hardboard, particle board, drinking containers and the like will exhibit similar beneficial properties due to incorporation of the present invention.

Example 2

Effects of Waxes on Linerboard: Water Resistance and Recyclability

In order to further evaluate both the palm oil and soy bean oil waxes they were compared against a commercially available coating wax supplied by Citgo Petroleum, Lake Charles, La. (Citgo Blend-Kote 467).

Coating Procedure

Coatings were made using a wet film applicator (Bird type) with a 1.5 to 5 mil gap depending on viscosity. The coating, the 4 inch wide applicator and sheets of ½ inch thick plate glass were placed into a 200 to 250 degrees F. oven for 10–15 minutes. The glass was removed from the oven and strips of the linerboard (unbleached Kraft paper, as known to those skilled in the art) were placed onto the glass. A volume of the specific coating was placed at one end of the linerboard, the applicator applied to the linerboard and the hot molten coating drawn by hand to coat the linerboard, which was then allowed to solidify at ambient temperature. Each sample was tested to assure a coat weight in the range of 5.6 to 6.2 lb1/1000 square feet.

Moisture vapor transmission rate ("MVTR")

Moisture transmission is an important property of wax-based coatings. MVTR indicates how rapidly moisture would penetrate the wax coating and degrade the properties of the substrate. It is desirable to have a low MVTR in cartons containing produce, where excessive moisture would cause spoilage of the fruits or vegetables. Poultry is often shipped in freezer boxes, which are generally wax coated corrugated boxes (kraft paper coated with wax) that are packed with poultry (or other food item) and then rapidly chilled, often by immersion in a ice/water bath. If the paper were not protected from the water, the strength of the box would degrade, making the use of these kinds of boxes impractical.

In this experiment MVTR was tested by a modified ASTM D3833 method. The modification required the use of clamps to assure adhesion of the linerboard to the aluminum cup.

The results are summarized in Table 3, which illustrates that while the coating weights were comparable; the soybean oil wax composition resulted in MVTR levels comparable to that of the control preparation.

Repulping Tests

To test the feasibility of repulping the wax coated samples, one and one half liter (1.51) of approximately 120 degrees F hot tap water was placed in the chamber of an Osterizer Blender (Model 6641). To the water was added 3.98 grams of Sodium Carbonate. The blender was set on low speed and run for one minute to dissolve the sodium carbonate. The aqueous solution had a pH of approximately 10. Then 5 grams of wax coated linerboard sample (prepared as described above) was added into the water. The blender was run for ten minutes and then stopped briefly to look for sample pieces that had stuck to the sides of the lid. Any such pieces were removed from the lid, and added back to the water in the blender. The blender was then turned back on for an additional 10 minutes to complete the blending cycle. Immediately upon completion, 500 ml was poured off and diluted with an additional 500 ml of hot water. The diluted solution was poured into a quart jar. The samples were then subjectively compared to the Citgo Wax (control) sample.

The results of this evaluation are shown in Tables 3 and 4. The Marcus Oil Palm Wax had the best repulping results, the linerboard treated with it producing almost no particles evident and the coating all but disappearing into the repulping solution. The MVTR of this preparation, although higher than the control, is considered low and within the acceptable range for most food packaging applications.

The Soybean Wax sample produced fewer small particles than the control wax but many more particles than the Palm Wax in the repulping experiment. The Citgo control wax, as expected, had a very large number of small particles evident.

We claim:

1. A method of treating a cellulosic article such that the treated article is resistant to water, the method comprising the steps of:

heating a composition to a temperature sufficient to render the composition molten, the composition consisting essentially of approximately 50% to approximately 98% of a triglyceride having a melting point greater than 120 degrees F., and being characterized by an iodine value between 0 and 30, the triglyceride comprising an oil selected from the group consisting of soybean, corn, cottonseed, rape, canola, sunflower, palm, palm kernel, coconut, crambe, linseed and peanut;

applying to the cellulosic article a quantity of the molten composition sufficient to render the cellulosic article water resistant; and allowing the applied composition to solidify and form a coating, the coating being dispersible from the treated cellulosic article, when the treated cellulosic article is exposed to a warm, alkaline, aqueous solution.

2. The method as described in claim 1, wherein the melting point of the composition is between approximately 130 and 165 degrees F.

3. The method as described in claim 2, wherein the melting point of the composition most is between approximately 136 and 160 degrees F.

4. The method as described in claim 2, wherein the composition is further characterized by having a viscosity of between 10 to 200 cps at a temperature of 140 degrees F.

5. The method as described in claim 2, wherein the triglyceride comprises a fatty acid, the fatty acid having between approximately 8 to 22 carbon atoms.

6. The method as described in claim 5, wherein the fatty acid is stearic acid.

7. The method as described in claim 5, wherein the composition further comprises one or more compounds chosen from the group consisting of paraffins, microcrystalline waxes, stearic acid, and oleic acid, and wherein the triglyceride comprises at least 50% of the composition.

8. The method as described in claim 7, wherein the composition further comprises one or more compounds chosen from the group consisting of dispersants and surfactants.

9. The method as described in claim 8, wherein the cellulosic article is chosen from the group consisting of paper, kraft paper, corrugated paper and linerboard.

10. The method as described in claim 1, wherein the triglyceride is characterized by an iodine value of between 0 and 10.

11. The method as described in claim 10, wherein the triglyceride is characterized by an iodine value between approximately 2 and 5.

* * * * *

UNITED STATES PATENT AND TRADEMARK OFFICE
CERTIFICATE OF CORRECTION

PATENT NO. : 6,811,824 B2
APPLICATION NO. : 10/137689
DATED : November 2, 2004
INVENTOR(S) : Hassan et al.

It is certified that error appears in the above-identified patent and that said Letters Patent is hereby corrected as shown below:

Please insert the following four tables in column 10, after line 56, before the claims:

Table 1:

Typical properties of Hydrogenated Soybean Oil
(Archer Daniels Midland (Decatur Ill.)
designated by their product number 86-197- 0)

| Property | Typical analysis |
|---|---|
| Lovibond Red Color | 2.0 max |
| Saponification | 180 mgKOH/g |
| Viscosity | 60SUS @ 210F |
| Hardness (needle penetration) | 2dmm @77F |
| %FFA Max. | 0.10 max |
| Flavor Min. | Characteristic |
| P.V. Mil eq/kg/max. | 1.0max |
| F.I. min | 8.0 min |
| Specific gravity (H2O = 1) | 0.92 |
| % Moisture max. | 0.05 max |
| I.V. by R.I. | 2.0 max |
| Iron (ppm) | 0.3 max |
| Soap (ppm) | 3.0 max |
| Nickel (ppm) | 0.02 max |
| Copper (ppm) | 0.05 max. |
| Phosphorous (ppm) | 15.0 Max |
| Residual Citric Acid (ppm) | 15.0 max |
| Mettler Drop Point (F) | 155-160 |
| Typical Fatty Acid Composition (by GLC) | |
| C 14:0* | 3.0 max |
| C 16:0 | 3-14 |
| C 18:0 | 82-94 |
| C20:0 | 5 max |

*number of carbon atoms:number of double bonds (e.g., 18:2 refers to linoleic acid palmitic acid (16:0), stearic acid (18:0), oleic acid (18:1), arachidic acid (20:0) and behenic acid (22:0)

UNITED STATES PATENT AND TRADEMARK OFFICE

CERTIFICATE OF CORRECTION

PATENT NO. : 6,811,824 B2
APPLICATION NO. : 10/137689
DATED : November 2, 2004
INVENTOR(S) : Hassan et al.

It is certified that error appears in the above-identified patent and that said Letters Patent is hereby corrected as shown below:

Table 2:

Typical properties of Hydrogenated Palm Oil
(Custom Shortenings & Oils (Richmond, VA)
Product Master Chef Stable Flake-P.)

| Property | Typical analysis |
|---|---|
| Lovibond Red Color | 4.0 max |
| %Free Fatty Acids Max. | 0.10 max |
| Flavor Min. | Bland |
| Iodine Value. by R.I. | 5.0 max |
| Mettler Drop Point (f) | 136-142 |
| Saponification | 185 mgKOH/g |
| Viscosity | 65 SUS @210 F |
| Hardness (needle penetration) | 2-3 dmm @77F |
| Typical Fatty Acid Composition (by GLC) | |
| C8:0* | 0.3% max |
| C 10:0 | 0.3 max |
| C 12:0 | 0.5% max |
| C 14:0 | 1.1% max |
| C16:0 | 39.5% min |
| C18:0 | 53.0% min |
| C18:1 | 1.0% max |
| C 18:2 | 0.5% max |

*number of carbon atoms:number of double bonds (e.g., 18:2 refers to linoleic acid

UNITED STATES PATENT AND TRADEMARK OFFICE

CERTIFICATE OF CORRECTION

PATENT NO. : 6,811,824 B2
APPLICATION NO. : 10/137689
DATED : November 2, 2004
INVENTOR(S) : Hassan et al.

It is certified that error appears in the above-identified patent and that said Letters Patent is hereby corrected as shown below:

Table 3:

| MXTR Evaluation (ASTM D3833) | | | |
|---|---|---|---|
| Wax Sample | Control Citgo Blend-Kote 467 | Marcus Palm Oil Wax | Marcus Nat 155 Soy Wax |
| Sample Coating Weight lb/100sqft | 5.8 | 5.6 | 5.7 |
| MVTR (Grams/100 sq inches in 24 hours) | 8.6 ± 0.9 | 14.5 ± 1.1 | 10.0 ± 0.4 |

UNITED STATES PATENT AND TRADEMARK OFFICE

CERTIFICATE OF CORRECTION

PATENT NO. : 6,811,824 B2 
APPLICATION NO. : 10/137689
DATED : November 2, 2004
INVENTOR(S) : Hassan et al.

It is certified that error appears in the above-identified patent and that said Letters Patent is hereby corrected as shown below:

Table 4:

| | Repulping Evaluation | | |
|---|---|---|---|
| Wax Sample | Control Citgo Blend-Kote 467 | Marcus Palm Oil Wax | Marcus Nat 155 Soy Wax |
| Sample Coating Weight lb/1000sqft | 5.7 | 5.7 | 5.8 |
| Repulping test results 0= No particles evident 1= small number of small particles evident 2= Moderate number of small particles evident (less than control wax) 3= Very large number of small particles are evident (Control wax) | 3 | 0.5 | 2 |

Signed and Sealed this

Twenty-first Day of November, 2006

JON W. DUDAS
*Director of the United States Patent and Trademark Office*